(12) United States Patent
Hernacki et al.

(10) Patent No.: US 8,341,734 B1
(45) Date of Patent: Dec. 25, 2012

(54) METHOD AND SYSTEM TO AUDIT PHYSICAL COPY DATA LEAKAGE

(75) Inventors: Brian Hernacki, San Carlos, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1089 days.

(21) Appl. No.: 12/215,582

(22) Filed: Jun. 27, 2008

(51) Int. Cl.
  *G06F 21/24* (2006.01)
  *H04L 29/02* (2006.01)
(52) U.S. Cl. .............................. 726/21; 726/30; 380/243
(58) Field of Classification Search .................... None
  See application file for complete search history.

(56) References Cited

U.S. PATENT DOCUMENTS

| | | | |
|---|---|---|---|
| 2005/0021980 A1* | 1/2005 | Kanai | 713/182 |
| 2005/0228685 A1* | 10/2005 | Schuster et al. | 705/1 |
| 2005/0251865 A1* | 11/2005 | Mont et al. | 726/26 |
| 2006/0089983 A1* | 4/2006 | Piersol | 709/223 |
| 2006/0136491 A1* | 6/2006 | Berkner et al. | 707/103 R |
| 2006/0268321 A1* | 11/2006 | Brack et al. | 358/1.15 |
| 2007/0008572 A1* | 1/2007 | Morikawa et al. | 358/1.15 |
| 2007/0136821 A1* | 6/2007 | Hershaft et al. | 726/27 |
| 2009/0086252 A1* | 4/2009 | Zucker et al. | 358/1.14 |

OTHER PUBLICATIONS

McAfee Network Data Loss Prevention Learning Applications. McAfee(2008). Press Release.*
U.S. Appl. No. 11/477,142, filed Dec. 2006, Pittenger et al.*

* cited by examiner

*Primary Examiner* — Venkat Perungavoor
(74) *Attorney, Agent, or Firm* — Lowenstein Sandler PC

(57) ABSTRACT

A document handling device receives a user request to perform a task on document data. The document data is associated with an electronic document to be converted by the document-handling device into a non-digital form (e.g., paper), or with a physical document received by the document-handling device in a non-digital form. The document handling device or a server determines whether the requested task violates a data loss prevention policy, and records, in an audit trail, information identifying the requested task and the digital data, and an indication of whether the requested task violates the data loss prevention policy.

21 Claims, 7 Drawing Sheets

METHOD AND SYSTEM TO AUDIT PHYSICAL COPY DATA LEAKAGE

FIELD OF INVENTION

Embodiments of the invention relate to the field of processing data, and more particularly, to auditing data leakage.

BACKGROUND OF THE INVENTION

Employees of a modern organization often deal with various documents concerning significant business aspects of the organization. These documents may include data on customers (or patients), contracts, deliveries, supplies, employees, manufacturing, or the like. Existing security techniques typically monitor handling of document data in digital form by employees to prevent loss of sensitive information. Document data in digital form may include data stored in databases or repositories, data transferred in electronic messages (e.g., email and text messages), data copied to hard drives or compact discs, and the like.

Documents handled by employees of an organization are not limited to digital data and include a large number of physical (paper) documents. Devices that handle physical documents include, for example, printers, scan machines, fax machines, and copy machines. Over the last decade, these devices have become increasingly connected, controlled, and audited. In modern organizations, many of these devices are now full-blown IT devices with network and email connectivity. Often, they run embedded operating systems (e.g., Windows Embedded XP of Microsoft® Corporation) and include storage devices such as hard drives. These storage devices can provide a trivial means for attackers to circumvent otherwise strongly controlled environments. In addition, existing data leakage controls can be evaded by using paper documents produced by printers, copiers and fax machines.

SUMMARY OF THE INVENTION

A method and system for auditing data leakage is described. In one embodiment, the method includes receiving a user request to perform a task on document data with a document-handling device. The document data may be associated with an electronic document to be converted by the document-handling device into a non-digital form (e.g., paper), or with a physical document received by the document-handling device in a non-digital form. The method further includes determining whether the requested task violates a data loss prevention policy, and recording, in an audit trail, information identifying the requested task and the digital data, and an indication of whether the requested task violates the data loss prevention policy.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
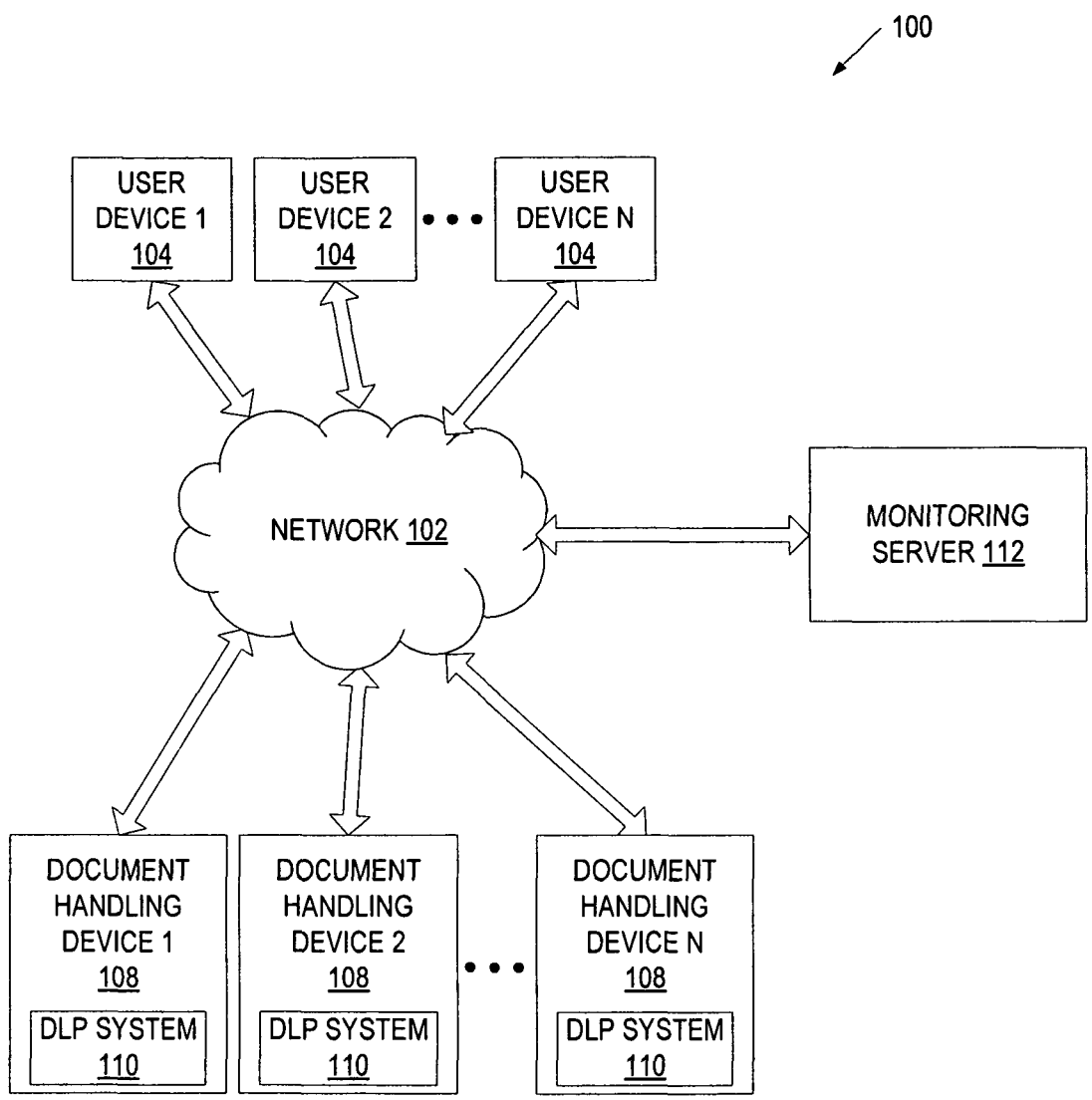
FIG. 1 illustrates an exemplary network architecture in which embodiments of the invention may operate.

A method and system for auditing data leakage is described. Data leakage can occur when a document-handling device transfers a document from a digital form to a non-digital form or vice-versa. A document-handling device can be, for example, a printer, a copy machine, a scan machine, a fax machine, or any combination of the above. In one embodiment, as document data is sent to the document-handling device (e.g., when requesting network printing) or read from a scan head of the document-handling device (e.g., when requesting scanning, copying or faxing), a copy of the document data is sent to a queue of the document-handling device. Items from the queue are then processed to determine whether they violate a data loss prevention (DLP) policy. This processing can be performed by a DLP violation detector hosted by the document-handling device, or it can be performed, at least partially, by a separate server. Information identifying the requested task and the document data is stored in an audit trial, together with a policy violation indicator.

In one embodiment, the document-handling device delays the execution of the requested task until the DLP processing is completed, and then determines whether the requested task can proceed based on the result of the DLP processing. In an alternative embodiment, the document-handling device allows the requested task to proceed in parallel with the DLP processing. In this alternative embodiment, remediation actions can be taken at a later time based on information recorded in the audit trail.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the invention may operate. The architecture 100 represents a network of an organization, in which user devices 104 are coupled to a network 102 that may be a private network such as a local area network (LAN), or a public network such as the Internet. User devices 104 may be, for example, personal computers (PCs), laptops, personal digital assistants (PDAs), computer appliances, etc.

Document-handling devices 108 are also coupled to the network 102 (e.g., using server message block (SMB) protocol) to provide various functionalities to the employees of the organization. Document-handling devices 108 transfer documents from a digital form to a non-digital form or vice-versa, and may include, for example, printers, copy machines, fax machines, scan machines, combinations of copy and scan machines, and the like. Document-handling devices 108 may provide user identification capability using, for example, fingerprint identifiers, user personal code identifiers, etc. In addition, document-handling devices 108 may provide auditing capability including, for example, storing characteristics of the task being performed (e.g., number of copies, identifications of parties associated with the task, etc.) and reporting to a central server such as a monitoring server 112.

In one embodiment, each document-handling device 108 hosts a data loss prevention (DLP) system 110 that detects violations of DLP policies and extends the devices' auditing capability to record such violations and report them to the monitoring server 112. A DLP policy may specify conditions that trigger a violation based on regulations concerning handling of sensitive information maintained by an organization, or based on corporate data governance rules. The regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. The corporate data governance rules may control additional aspects of handling use-restricted documents within an organization. A use-restricted document represents a document that cannot be freely distributed or manipulated due to its sensitive nature. Use-restricted documents may optionally include specific logos, watermarks, and stamps "confidential," "sensitive," "stock," etc., to indicate their sensitive nature.

In one embodiment, the DLP system 110 performs the entire DLP processing and auditing, and reports detected violations to the monitoring server 110. Alternatively, the DLP system 110 performs the DLP processing and/or auditing in cooperation with a server's module, as will be discussed in more detail below. The server may be the monitoring server 112 or some other server coupled to the document handling devices 108 via the network 102.

Figure 2:
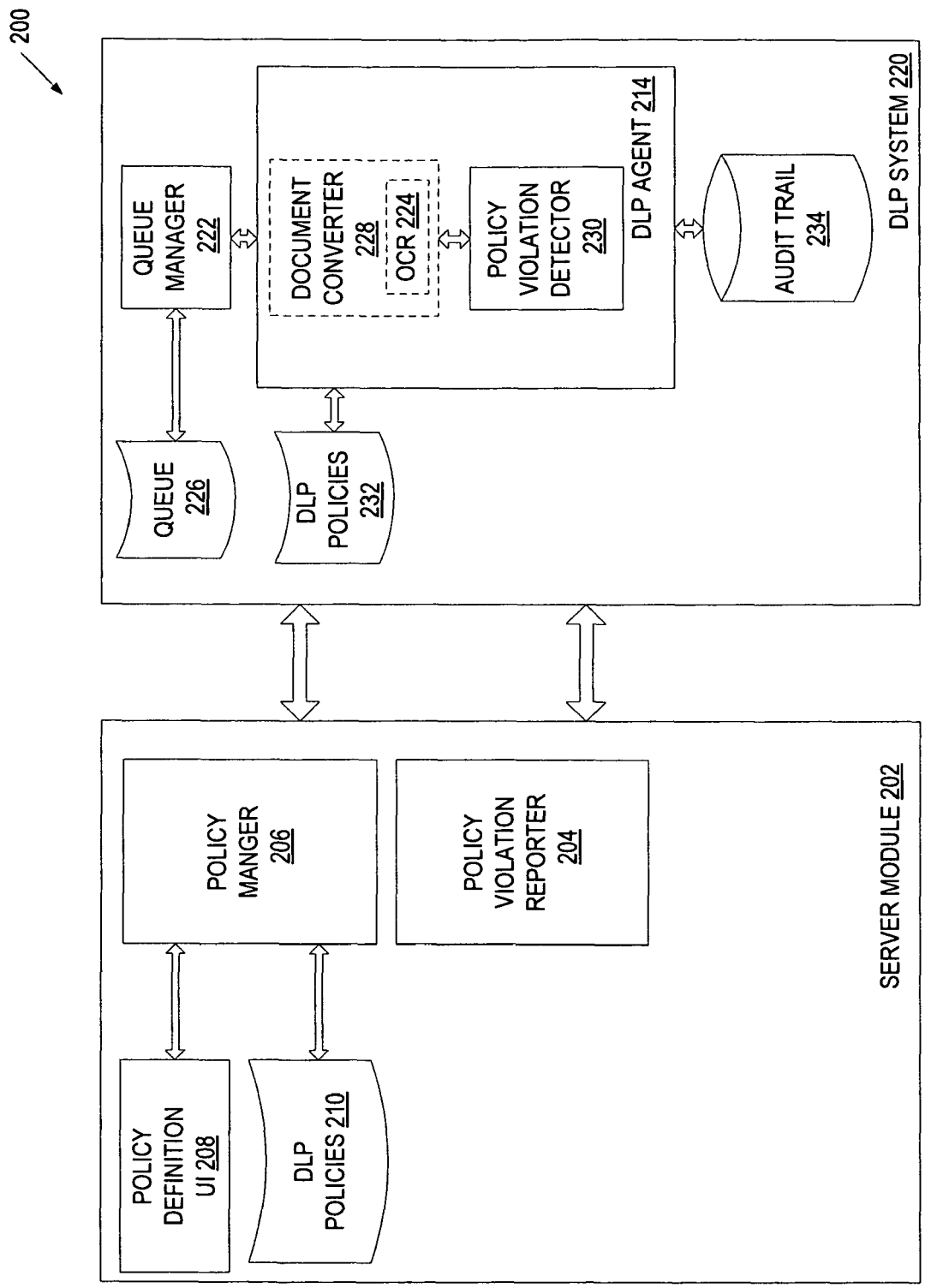
FIGS. 2 and 3 are block diagrams of two alternative embodiments of a system for auditing data leakage.

FIG. 2 is a block diagram of one embodiment of a system 200 for auditing data leakage. The system 200 may include a DLP system 220 hosted by a document-handling device and a server module 202 hosted by a server (e.g., a monitoring server).

The server module 202 may include a policy manager 206 and a policy violation reporter 204. The policy manager 206 is responsible for receiving parameters pertaining to policies, such as pre-configured template policies or customized policies, and creating DLP policies 210 based on these parameters. In one embodiment, the policy manager 206 receives the policy parameters via a policy definition user interface (UI) 208. In another embodiment, the policy manager 206 receives the policy parameters from an Application Programming Interface (API) or via a configuration file formatted in text or a defined data format (e.g., extensible markup language (XML) or binary format).

As discussed above, the DLP policies 210 may be created based on regulations concerning handling of sensitive information maintained by an organization, or based on corporate data governance rules. In one embodiment, the policy manager 206 may use policy templates or customized policies pre-configured based on input provided by individuals familiar with the relevant regulations or corporate data governance rules.

A DLP policy 210 may specify conditions for triggering a violation. For example, a DLP policy 210 may indicate that a violation will be triggered if a document containing certain use-restricted characteristics (e.g., the stamp "confidential") is requested to be handled in a specific manner (e.g., copied, scanned, faxed or printed). In another example, a DLP policy 210 may indicate that a violation will be triggered if a requested number of copies to be made from a document containing certain use-restricted characteristics exceeds a predefined threshold. In yet another example, a DLP policy 210 may indicate that a violation will be triggered if a document containing certain use-restricted characteristics is printed or copied in a specific form (e.g., on certain paper types, without letterheads, without a "confidential" stamp or watermark, etc.). In still another example, a DLP policy 210 may indicate that a violation will be triggered if the document to be faxed, copied, scanned or printed includes protected data such as keywords or content from a protected source (e.g., database containing sensitive information) or is similar to at least one of a collection of use-restricted documents. In yet another example, a DLP policy 210 may indicate that a violation will be triggered if a document containing certain use-restricted characteristics is requested to be faxed to a specific destination (e.g., specific fax number). In still another example, a DLP policy 210 may indicate that a violation will be triggered if a document (e.g., a fax) containing certain use-restricted characteristics is requested to be received by an unauthorized user.

A DLP policy 210 may also differentiate between different user security levels. That is, a set of conditions may trigger a violation if a user has a security level below a threshold, and may not trigger a violation if the user has a security level equal to, or above, the threshold.

Once the DLP policies 210 are created or modified, the policy manager 206 may transfer them to the DLP system 220 residing on the document-handling device. The policy manager 206 may transfer the same DLP policies 210 to all document-handling devices on the corporate network. Alternatively, the policy manager 206 may transfer only relevant subsets of the DLP policies 210 to individual document-handling devices depending on their characteristics. For example, the policy manager 206 will transfer to copy machines only DLP policies that pertain to copying. The policy manager 206 may transfer all current DLP policies periodically or only those that have been modified or added.

The policy violation reporter 204 is responsible for receiving information regarding policy violations from the DLP system 220, and creating reports based on this information. The reports may be created for system administrators and/or other employees of an organization (e.g., for a supervisor of a user that caused a violation). In addition, or alternatively, the policy violation reporter 204 may generate a violation notification and send it to appropriate individuals or systems (e.g., via email, text message, pager alert, etc.).

The DLP system 220 includes a persistent queue 226, a queue manager 222, a DLP agent 214, and an audit trail 234. The queue manager 222 receives user requests for tasks to be performed on document data with the document-handling device, and sends the document data to the queue 226. In one embodiment, the queue manager 222 sends a copy of document data to the queue 226 upon receiving the document data at the document-handling device (e.g., for network printing), or upon reading the document data from the scan head of the document-handling device (e.g., for scanning, faxing, and copying). The document-handling device may be a special purpose PC including persistent internal storage and, therefore, the queue 226 can be very large.

In one embodiment, the queue manager 222 stores the document data in the queue 226, together with information identifying the requested task and the user that requested the task. The information identifying the requested task may include, for example, an identifier of the underlying operation (e.g., copy, scan, etc.) and other task data such as a requested number of copies, a requested destination or recipient of the task (e.g., when faxing a document), a customer for which the task is requested to be performed (e.g., when copying or scanning a document), etc. The information identifying the user may include the user ID and the user's security level.

In one embodiment, the items in the queue 226 are stored in the order in which they were received at the queue 226. In another embodiment, the items in the queue 226 are stored based on user security levels to allow items with the highest user security level to be processed first. In addition, the tasks to be performed can be placed in the queue 226 in the order they were requested or based on the users' security levels.

The DLP agent 214 obtains an item from the queue 226 and processes it to determine whether the task associated with this item violates any of the DLP policies 232 received from the server. In one embodiment, the DLP agent 214 includes a document converter 228 and a policy violation detector 230. The document converter 228 is responsible for finding characteristics of a use-restricted document in the document data of the item. In one embodiment, in which the item's document data is an image (e.g., captured by the scan head of the document-handing device), the document converter 228 performs an image recognition analysis (e.g., using embedded object tagging) to find characteristics of a use-restricted document such as logos, watermarks, stamps "confidential," "sensitive," "stock," etc. In addition, or alternatively, the document converter 228 may include an optical image recognition (OCR) component 224 that converts this image into machine-readable text.

In one embodiment, once the document converter 228 completes its process, the resulting characteristics of a use-restricted document and/or text of the document data are passed to the policy violation detector 230 for detecting possible violations of DLP policies. In this embodiment, the requested task is delayed until the policy violation detector 230 completes its analysis. For example, based on the user's security level, the requested task can be queued until the DLP agent 214 allows it to proceed or rejects it depending on the result provided by the policy violation detector 230.

In another embodiment, once the document converter 228 completes its process, information about the item is recorded in the audit trail 234, and the requested task is allowed to proceed in parallel with the analysis of the policy violation detector 230. The audit trail 234 may be a file, a collection of files, a database, or any other data store. The item information recorded in the audit trail may include an identifier of the document data, an identifier of the requested task, and an identifier of the user. The identifier of the document data may include an original image in a compressed form, and/or converted text, and/or any other information characterizing the document data. The identifier of the requested task may include an identifier of the underlying operation (e.g., copy, scan, etc.) and/or other task data such as a requested number of copies, a requested destination or recipient of the document data (e.g., when faxing a document), a customer for which the task is requested to be performed (e.g., when copying or scanning a document), etc. The identifier of the user may include the user ID and/or the user's security level.

In yet another embodiment, the requested task can be allowed to proceed anytime after the relevant item is sent to the queue 226, and the audit trail recording can start when the relevant item is retrieved from the queue 226 for processing, after the conversion of the document data (e.g., using OCR), or upon completion of DLP analysis by the policy violation detector 230.

The order in which the document conversion, DLP analysis and auditing are performed can be configurable (e.g., by a system administrator) or predetermined. The DLP system 200 may provide a user interface to allow a system administrator to configure the sequence of the above operations.

The policy violation detector 230 is responsible for applying relevant DLP policies 232 to the item information. The item information may include detected use-restricted sub-elements and/or text from the document data, information identifying the requested task, and information identifying the user. A DLP policy 232 may require a content-specific determination and/or a task-specific determination. A content-specific determination may involve, for example, a search for keywords, regular expression patterns or data from a protected source in the document data, or a comparison of the document data with a collection of use-restricted documents. The policy violation detector 230 can perform a content-specific determination involving a search for keywords, regular expression patterns, or data from a protected source using text similarity analysis. The policy violation detector 230 can perform a content-specific determination involving a comparison of the current document with a collection of use-restricted documents using a signature similarity analysis. Alternatively, the policy violation detector 230 can use various other mechanisms known in the art to perform content-specific determinations in accordance with the DLP policies 232.

As discussed above, DLP policies 232 can (in addition or alternatively) require a task-specific determination. A task-specific determination may involve, examining characteristics of the task such as the underlying operation, a requested number of copies, a specified destination (e.g., fax number), parameters of the physical document to be produced (e.g., paper type, letterheads, "confidential" stamps, watermarks, etc.), an identifier of a recipient (e.g., a fax recipient), etc. For example, the DLP policy 232 may be violated if the document includes the "confidential" stamp and the number of requested copies is more than one.

Further, the DLP policy 232 may distinguish between user security levels. Then, the policy violation detector 230 may use the security level of the user that requested the task to determine whether the requested task violates the DLP policy 232.

In one embodiment, the policy violation detector 230 produces a policy violation indicator that signifies whether the requested task violates the DLP policy 232. The policy violation indicator can have only two values corresponding to "yes" and "no." Alternatively, the policy violation indicator can provide a rating illustrating how close the requested task is to violating the policy. The rating can be calculated based on the likelihood of meeting every condition of the policy by the requested task (e.g., the document data can resemble a protected document by 70 percent as opposed to 100 percent).

In some embodiments, in which the audit trail recording starts after the completion of the DLP analysis, the DLP agent 214 records in the audit trail 234 an identifier of the document data, an identifier of the requested task, an identifier of the user, and a policy violation indicator. In other embodiments, in which the audit trail recording starts prior to the completion of the DLP analysis, the DLP agent 214 adds to the audit trail a policy violation indicator produced for the relevant item by the policy violation detector 214.

The information recorded in the audit trail 234 is subsequently provided to the policy violation reporter 204 which reports policy violations to appropriate entities, as described in more detail above.

Figure 3:
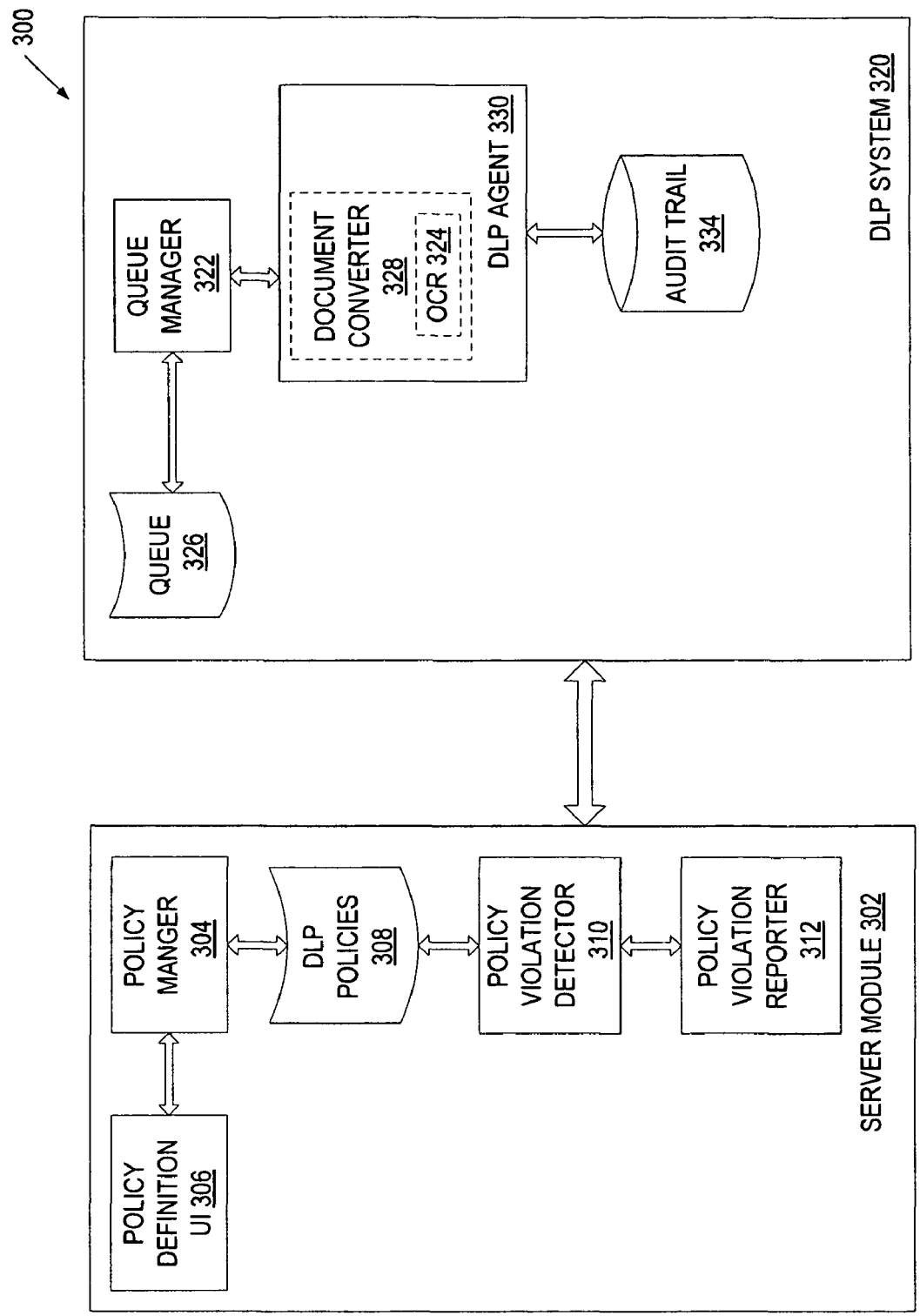

FIG. 3 is a block diagram of an alternative embodiment of a system for auditing data leakage. System 300 includes a DLP system 320 hosted by a document-handling device and a server module 302 hosted by a server (e.g., a monitoring server).

The server module 302 includes a policy manager 304, a policy violation detector 310, and a policy violation reporter 312. The policy manager 304 creates DLP policies 308 (e.g., using input provided via UI 306) similarly to the policy manager 206 of FIG. 2.

The policy violation detector 310 is responsible for detecting violations of DLP policies by tasks requested to be performed with the document-handling device. In particular, the policy violation detector 310 receives task information from the DLP system 320 and determines whether the task violates any of the DLP policies 308. The policy violation detector 310 then communicates the result back to the DLP system 320.

The policy violation reporter 312 is responsible for creating reports based on the result provided by the policy violation detector 310 and task information provided by the DLP system 320. The reports may be created for system administrators and/or other employees of an organization (e.g., for a supervisor of a user that caused a violation). In addition, or alternatively, the policy violation reporter 312 may generate a violation notification and send it to appropriate individuals or systems (e.g., via email, text message, pager alert, etc.).

The DLP system 320 includes a persistent queue 326, a queue manager 322, a DLP agent 314, and an audit trail 334. The queue manager 322 receives user requests for tasks to be performed on document data with the document-handling device, and sends the document data to the queue 326, together with information identifying the requested task and the user that requested the task, as was discussed in more detail below in conjunction with the queue manager 222 of FIG. 2.

The DLP agent 330 may include a document converter 328 that obtains an item from the queue 326 and processes it in a similar manner as the document converter 228 discussed above.

In one embodiment, once the document converter 328 completes its process, the resulting characteristics of a use-restricted document and/or text of the document data are sent to the server for processing by the policy violation detector 310. In this embodiment, the requested task is delayed until the policy violation detector 310 completes its analysis and returns the result back to the DLP agent 330. Depending on the result, the DLP agent 330 can allow the requested task to proceed or can reject the requested task.

In another embodiment, once the document converter 328 completes its process, information about the item is recorded in the audit trail 334, and the requested task is allowed to proceed in parallel with the analysis of the policy violation detector 310. The item information recorded in the audit trail 334 may include an identifier of the document data, an identifier of the requested task, and an identifier of the user.

In yet another embodiment, the requested task can be allowed to proceed anytime after the relevant item is sent to the queue 326, and the audit trail recording can start when the relevant item is retrieved from the queue 326 for processing, after the conversion of the document data, or after the policy violation detector 310 completes its analysis.

As discussed above, the order of the above operations can be configurable (e.g., by a system administrator) or predetermined.

Once the policy violation detector 310 completes the DLP analysis, it returns the result of the analysis to the DLP agent 330. In some embodiments, in which the audit trail recording starts after the completion of the DLP analysis, the DLP agent 330 records, in the audit trail 334, an identifier of the document data, an identifier of the requested task, an identifier of the user, and a policy violation indicator. In other embodiments, in which the audit trail recording starts prior to the completion of the DLP analysis, the DLP agent 330 adds to the audit trail a policy violation indicator produced for the relevant item by the policy violation detector 310.

The information recorded in the audit trail 334 can be subsequently provided to the policy violation reporter 312 for reporting and/or alert generations. In an alternative embodiment (not shown), the audit trail 234 resides on the server, and the recording is done based on information provided by the DLP system 300 and the policy violation detector 310.

Figure 4:
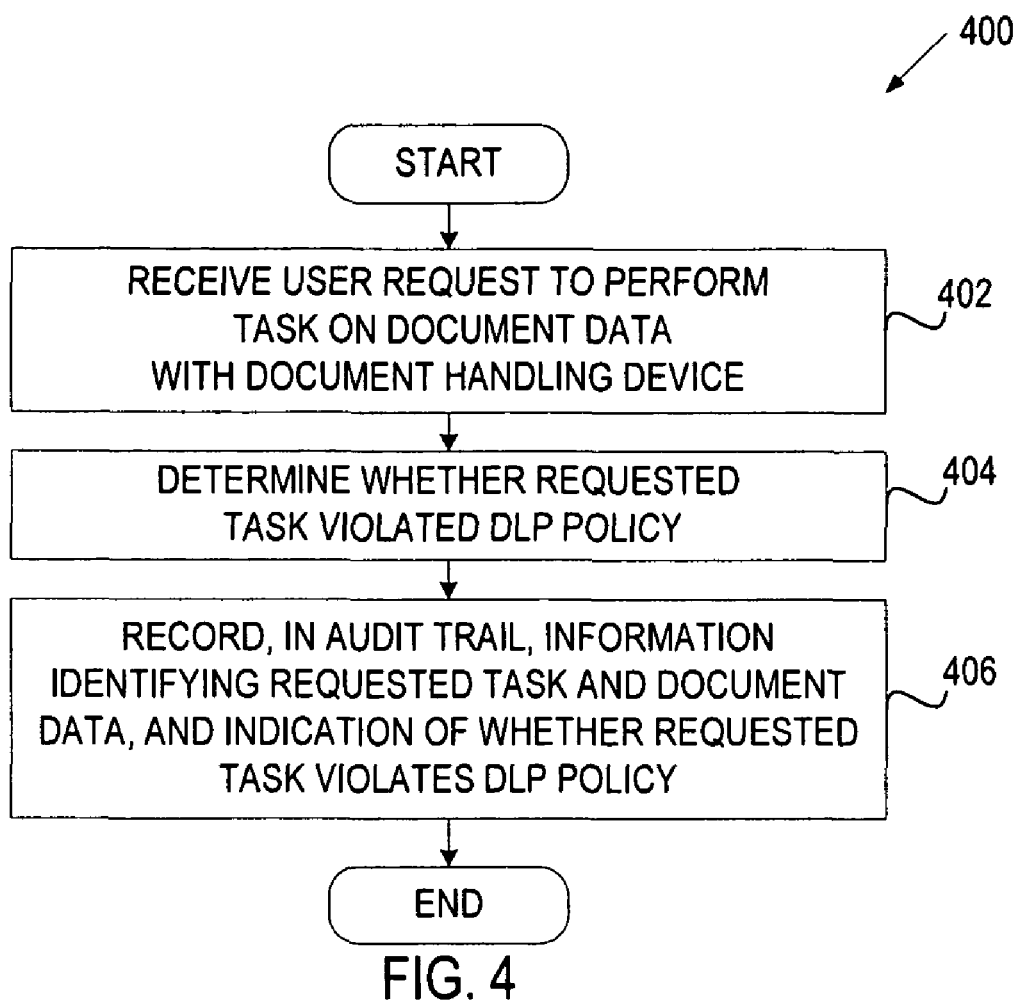
FIG. 4 is a flow diagram of one embodiment of a method for auditing data leakage.

FIG. 4 is a flow diagram of one embodiment of a method 400 for auditing physical copy data leakage. The method 400 is performed by processing logic that may comprise hardware (circuitry, dedicated logic, etc.), software (such as is run on a general purpose computer system or a dedicated machine), or a combination of both. In one embodiment, the method 400 is performed by a document-handling device (e.g., device 108 of FIG. 1). In another embodiment, the method 400 is performed by a document-handling device in cooperation with a server (e.g., device 108 and server 112 of FIG. 1).

Referring to FIG. 4, processing logic begins with receiving a user request to perform a task on document data with a document-handling device (block 402). The document data may be associated with a physical (e.g., paper) document that will be converted by the document-handling device into a digital form (e.g., when the document-handling device is a copy, scan or fax machine). Alternatively, the document data may be associated with an electronic document that will be converted by the document-handling device into a non-digital form (e.g., when the document-handling device is a printer). In one embodiment, upon receiving a user request to perform a task, processing logic sends the task and the document data to a queue on the document-handling device.

At block 404, processing logic determines whether the requested task violates a DLP policy. In one embodiment, this determination is made by examining the document data to find sub-elements of a use-restricted document (e.g., logos, watermarks, stamps "confidential," "sensitive," etc.), and then applying relevant DLP policies to the document data and/or characteristics of the requested task to detect a violation of any of the DLP policies. In one embodiment, in which the document data is stored in the queue in the form of an image, processing logic converts the image into text using OCR, and then uses the converted text when performing the DLP analysis.

At block 406, processing logic records in an audit trail information identifying the requested task and document data, as well as an indication of whether the requested task violates the DLP policy. Two exemplary embodiments of method 400 will now be discussed in more detail with references to FIGS. 5 and 6.

Figure 5:
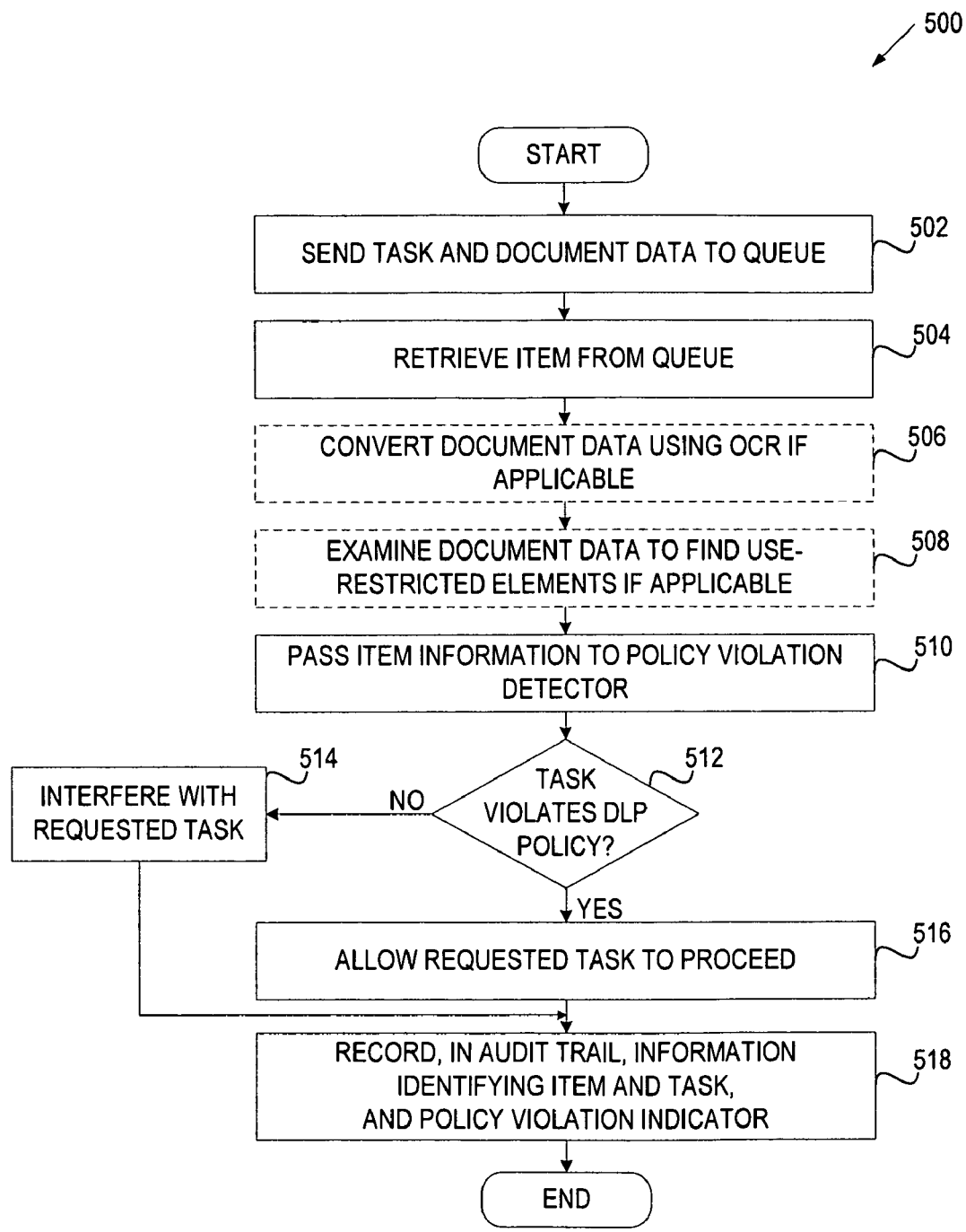
FIG. 5 is a flow diagram of one embodiment of a DLP auditing method performing DLP processing prior to the execution of a requested task.

FIG. 5 is a flow diagram of one embodiment of a DLP auditing method 500 performing DLP processing prior to the execution of a requested task. At block 502, processing logic sends tasks to be performed on document data, as well as corresponding document data, to a queue (e.g., a persistent queue).

At block 504, processing logic retrieves an item from the queue. In one embodiment, if the document data of the item is an image, processing logic converts the image into text using an OCR technique (block 506). In addition, or alternatively, processing logic can optionally examine the document data to find use-restricted sub-elements (e.g., logos, watermarks, "confidential" stamps, etc.) using an image recognition technique (block 508).

At block 510, processing logic passes item information to a policy violation detector. The item information may include detected use-restricted sub-elements and/or text from the document data, information identifying the requested task, and information identifying the user. The policy violation detector applies relevant DLP policies to the item information. A DLP policy may require a content-specific determination and/or a task-specific determination. A content-specific determination may involve, for example, a search for keywords, regular expression patterns, or data from a protected source in the document data, or a comparison of the document data with a collection of use-restricted documents. A task specific determination may involve, examining characteristics of the task such as the underlying operation, a requested number of copies, a specified destination (e.g., fax number), parameters of the physical document to be produced (e.g., paper type, letterheads, "confidential" stamps, watermarks, etc.), an identifier of a recipient (e.g., a fax recipient), etc. In addition, if a DLP policy distinguishes between user security levels, the policy violation detector can use the security level of the user for its analysis.

In one embodiment, the policy violation detector produces a policy violation indicator that signifies whether the requested task violates any of the DLP policies. The policy violation indicator can have only two values corresponding to "yes" and "no." Alternatively, the policy violation indicator can provide a rating illustrating how close the requested task is to violating the policy. The rating can be calculated based on the likelihood of meeting every condition of the policy by the requested task.

At block 512, processing logic determines whether the requested task violates at least one of the DLP policies based on the indicator provided by the policy violation detector. If the requested task does not violate any of the DLP policies, processing logic allows the requested task to proceed (block 516), and records in an audit trail an identifier of the task, an identifier of the document data, an identifier of the user, and a policy violation indicator (block 518).

If the requested task violates at least one of the DLP policies, processing logic interferes with the requested task (block 514). For example, processing logic can reject the task, display a warning, allow the task to proceed in a modified form (e.g., printing the document with watermarks), etc. At block 518, processing logic records in the audit trail an identifier of the requested task, an identifier of the document data, an identifier of the user, a policy violation indicator, and an identifier of an action that interfered with the requested task.

As discussed in more detail above, the method 500 can be performed entirely by the document-handling device. Alternatively, the method 500 can be performed by the document-handling device in cooperation with an off-host server. For example, the server can perform block 510 and return a policy violation indicator to the data-handling device. In addition, or alternatively, the audit trail can be stored on the server, and block 518 can be performed by the server based on information provided by the document-handling device.

Figure 6:
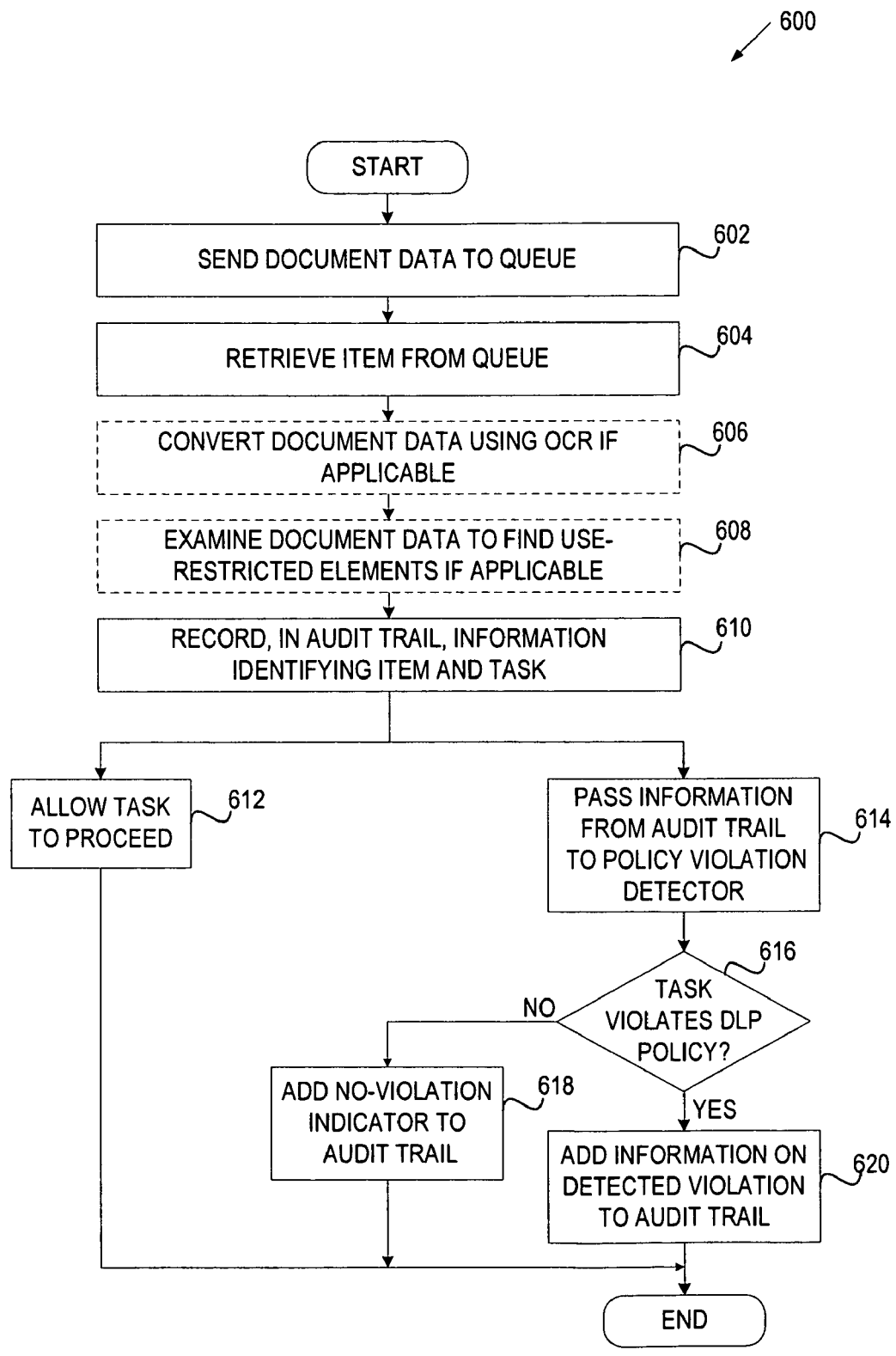
FIG. 6 is a flow diagram of one embodiment of a DLP auditing method performing DLP processing in parallel with the execution of a requested task.

FIG. 6 is a flow diagram of one embodiment of a DLP auditing method performing DLP processing in parallel with the execution of a requested task. At block 602, processing logic sends tasks to be performed on document data, as well as corresponding document data, to a queue.

At block 604, processing logic retrieves an item from the queue. In one embodiment, if the document data of the item is an image, processing logic converts the image into text using an OCR technique (block 606). In addition, or alternatively, processing logic can optionally examine the document data to find use-restricted sub-elements (e.g., logos, watermarks, "confidential" stamps, etc.) using an image recognition technique (block 608).

At block 610, processing logic records item information in an audit trail. The item information may include information identifying the document data of the item, information identifying the requested task, and information identifying the user. The document data may include detected use-restricted sub-elements, text from the document data, and/or original image data in compressed form.

Next, in one embodiment, processing logic allows the requested task to proceed (block 612), and passes the item information from the audit trail to the policy violation detector (block 614). In another embodiment, processing logic allows the requested task to proceed prior to block 610. In particular, the requested task can be allowed to proceed anytime between block 604 (after the document data and the task characteristics are sent to the queue) and the completion of block 610.

At block 616, processing logic determines whether the requested task violates at least one of the DLP policies based on the indicator provided by the policy violation detector. If the requested task violates at least one of the DLP policies, processing logic adds information on the detected violation to the audit trail (block 620). If the requested task does not violate any of the DLP policies, processing logic adds to the audit trail data indicating that the requested task does not violate any of the DLP policies.

Allowing the requested task to be performed prior to the completion of the DLP analysis minimizes delays in the users' workflow and avoids giving attackers a direct indication (e.g., the task not being performed) of the theft detection.

As discussed in more detail above, the method 600 can be performed entirely by the document-handling device. Alternatively, the method 600 can be performed by the document-handling device in cooperation with an off-host server. For example, the audit trail can be stored on the server, and blocks 610, 618 and 620 can be performed by the server based on information provided by the document-handling device. Alternatively, the server can perform block 614 and return a policy violation indicator to the data-handling device. Yet alternatively, if both the audit trail is stored on the server and the DLP analysis is performed by the server, then block 610 and blocks 614 through 620 will be performed by the server.

Figure 7:
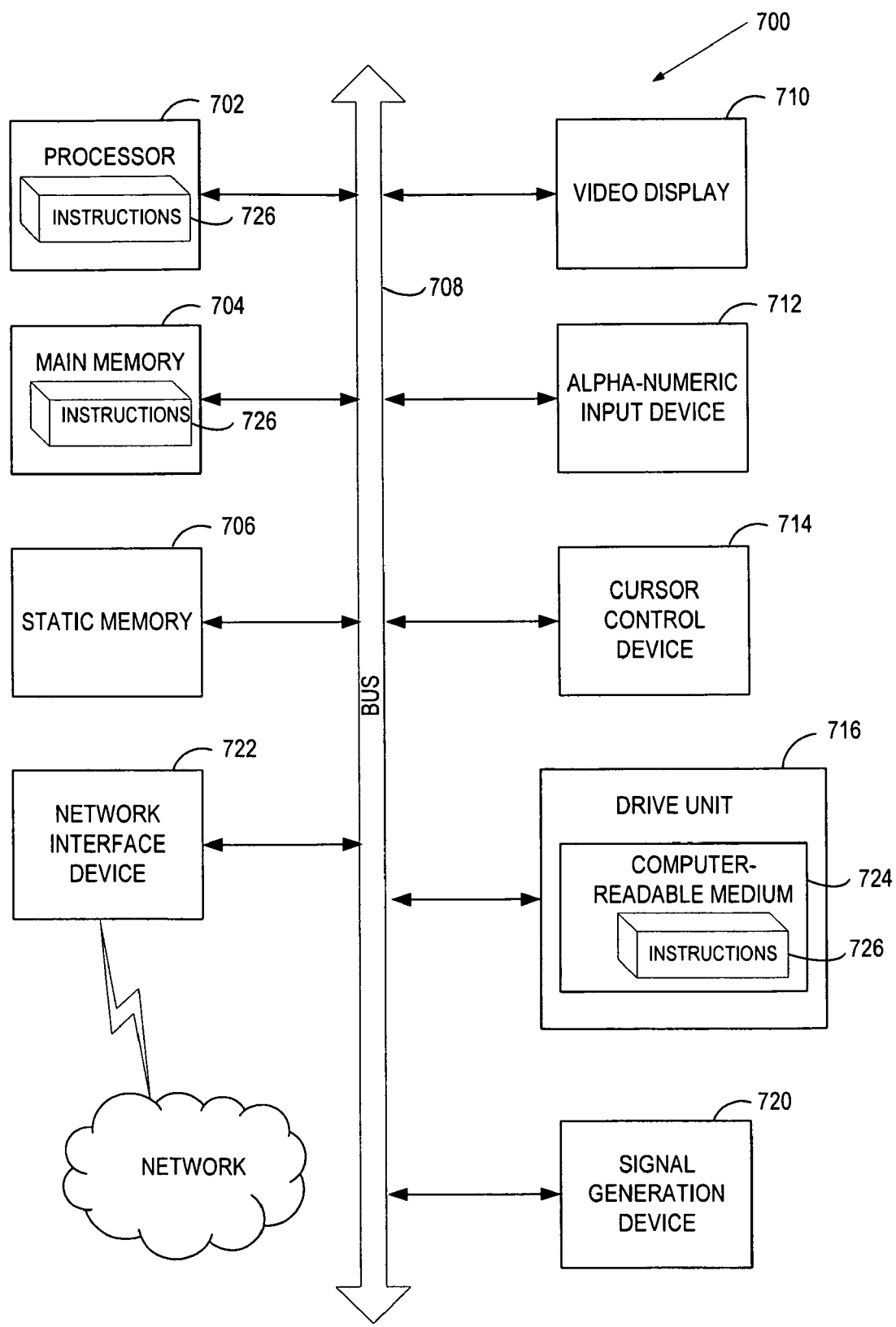
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method comprising:
   receiving, by a document handling device, a request to perform a task on document data, the document data being associated with one or more physical documents received by the document handling device in a non-digital form; and
   in response to the document handling device receiving the request, performing the following:
      converting, by the document handling device or a server computing device, the document data into text using optical image recognition (OCR);
      determining, by the document handling device or the server computing device, whether the requested task violates a data loss prevention policy, the converted text being used when determining whether the requested task violates the data loss prevention policy; and recording, in an audit trail, information identifying the requested task and the document data, and an indication of whether the requested task violates the data loss prevention policy.

2. The method of claim 1 wherein the document handling device is any one of a copy machine, a fax machine, a scan machine, and a printer.

3. The method of claim 1 further comprising:
sending the document data to a persistent queue of the document handling device upon receiving the request to perform the task on the document data.

4. The method of claim 1 further comprising:
examining the document data to find one or more characteristics of a use-restricted document, the one or more characteristics being used when determining whether the requested task violates a data loss prevention policy.

5. The method of claim 1 further comprising:
determining whether to allow the requested task to proceed depending on whether the requested task violates the data loss prevention policy.

6. The method of claim 1 further comprising:
allowing the requested task to proceed prior to determining whether the requested task violates the data loss prevention policy.

7. The method of claim 6 wherein:
the information identifying the requested task and the document data is recorded in the audit trail prior to determining whether the requested task violates a data loss prevention policy;
a determination as to whether the requested task violates the data loss prevention policy is performed based on the information recorded in the audit trail; and
the indication of whether the requested task violates the data loss prevention policy is recorded in the audit trail after determining whether the requested task violates the data loss prevention policy.

8. The method of claim 1 further comprises:
identifying a user requesting the task; and
recording an identifier of the user in the audit trail.

9. The method of claim 1 wherein a determination as to whether the requested task violates the data loss prevention policy is performed by the document handling device.

10. The method of claim 1 wherein a determination as to whether the requested task violates the data loss prevention policy is performed, at least in part, by the server computing device.

11. The method of claim 1 wherein the audit trail is maintained in the document handling device or in the server computing device.

12. The method of claim 1 wherein the data loss prevention policy requires at least one of the following evaluations concerning the requested task:
whether an underlying operation of the requested task is allowed to be performed;
whether a user is allowed to send the document data to a requested destination;
whether the document data is allowed to be produced in a requested form;
whether a requested recipient is allowed to receive the document data; and
whether a user is allowed to obtain a requested number of copies associated with the document data.

13. A document handling device comprising:
a memory to store instructions for a data loss prevention (DLP) system comprising a queue manager, an optical image recognition (OCR) module, a policy violation prevention agent and an audit trail;
a processing device, coupled to the memory, to execute the instructions;
the queue manager, executed by the processing device, to receive a request to perform a task on document data, the document data being associated with one or more physical documents received by the document handling device in a non-digital form;
the OCR module, executed by the processing device, to convert an image associated with the document data into text;
the policy violation prevention agent, executed by the processing device, to cause a determination to be made as to whether the requested task violates a data loss prevention policy, wherein the policy violation prevention agent is to use the converted text when determining whether the requested task violates the data loss prevention policy; and
the audit trail, maintained by the processing device, to store information identifying the requested task and the document data, and an indication of whether the requested task violates the data loss prevention policy.

14. The device of claim 13 further comprising:
a queue, maintained by the processing device, to store the document data and the requested task.

15. The device of claim 13 further comprising:
a document converter, executed by the processing device, to examine the document data for one or more characteristics of a use-restricted document.

16. A non-transitory computer readable storage medium that provides instructions, which when executed on a processing system of a document handling device cause the processing system to perform a method comprising:
receiving, by the processing system of the document handling device, a request to perform a task on document data, the document data being associated with one or more electronic documents to be converted by the document handling device into a non-digital form or with one or more physical documents received by the document handling device in a non-digital form;
determining whether the requested task violates a data loss prevention policy based on at least one of analysis by the processing system of the document handling device or information received from a server; and
recording, in an audit trail, information identifying the requested task and the document data, and an indication of whether the requested task violates the data loss prevention policy.

17. The non-transitory computer readable storage medium of claim 16 wherein the document handling device is any one of a copy machine, a fax machine, a scan machine, and a printer.

18. A non-transitory computer readable storage medium that provides instructions that, when executed on a processing system of a document handling device, cause the processing system to perform a method comprising:
receiving, by the processing system of the document handling device, a request to perform a task on document data, the document data being associated with one or more physical documents received by the document handling device in a non-digital form;
converting, by the processing system or by a server computing device, the document data into text using optical image recognition (OCR); and
determining, by the processing system or by the server computing device, whether the requested task violates a data loss prevention policy, the converted text being used when determining whether the requested task violates the data loss prevention policy.

19. The non-transitory computer readable storage medium of claim 18, the method further comprising:
recording, in an audit trail, information identifying the requested task and the document data, and an indication of whether the requested task violates the data loss prevention policy.

20. A system comprising:
a memory; and
a processor coupled with the memory to:
receive a request to perform a task on document data with a document handling device, the document data being associated with one or more electronic documents to be converted by the document handling device into a non-digital form or with one or more physical documents received by the document handling device in a non-digital form;
determine whether the requested task violates a data loss prevention policy, wherein a determination as to whether the requested task violates the data loss prevention policy is performed by at least one of the document handling device and a server; and
record, in an audit trail, information identifying the requested task and the document data, and an indication of whether the requested task violates the data loss prevention policy.

21. The device of claim 20, wherein the processor is further to examine the document data to find one or more characteristics of a use-restricted document, the one or more characteristics being used when determining whether the requested task violates a data loss prevention policy.

* * * * *